Figure 1:
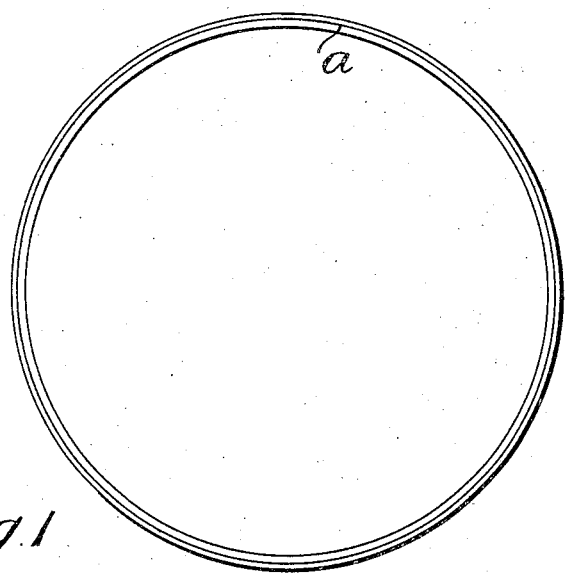

No. 767,430. PATENTED AUG. 16, 1904.
F. S. ORNSTIEN.
METHOD OF SHAPING RUBBER WHEEL TIRES.
APPLICATION FILED FEB. 27, 1903.
NO MODEL.

Witnesses
Barbara Lambert
H. L. Peil

INVENTOR
Frederick Saul Ornstien
By H. L. Reynolds
Attorney

No. 767,430. Patented August 16, 1904.

UNITED STATES PATENT OFFICE.

FREDERICK SAUL ORNSTIEN, OF KENSINGTON, VICTORIA, AUSTRALIA.

METHOD OF SHAPING RUBBER WHEEL-TIRES.

SPECIFICATION forming part of Letters Patent No. 767,430, dated August 16, 1904.

Application filed February 27, 1903. Serial No. 145,334. (No specimens.)

*To all whom it may concern:*

Be it known that I, FREDERICK SAUL ORNSTIEN, a subject of the King of Great Britain, residing at Macaulay Road, Kensington, in the State of Victoria, Australia, have invented certain new and useful Improvements in Methods of Shaping Rubber Wheel-Tires, of which the following is a specification.

This invention is designed for use with tire-covers of a kind which are in the nature of a web or band shape to act as a cover for an inner or air-retaining tube, the edges being separated from each other or not joined and provided with means by which they may be secured to or upon the wheel-rim. The best known types of such tires are those which are known in the trade as the "Dunlop," which are provided with wire rings in their edges of smaller size than the periphery of the rim edges, and the "Rambler," which has its edges engaging recesses in the rim.

This invention has been devised to provide a simple, economical, and efficient method and means whereby outer flexible covers for wheel-tires are shaped, curled, or rounded to the required sectional curve, so as to hold the inner pneumatic tube in its proper position and to permit the wires round the edges of the cover to be neatly ensconced in the rim of the wheel.

I take a freshly-vulcanized cover in its flat form before the same has been cooled and with the wires in their places complete. Into such cover I insert a complete ring formed of india-rubber hose of suitable diameter, (as usually employed for water-service.) This ring of hose has its exterior diameter exactly to agree with the normal diameter of the interior of the cover required to fit the wheel. I place this hose into a cover while the latter is still in a heated condition from the vulcanizing-machine, and I then bend the cover all round the hose by the action of the hands. The cover is then allowed to cool with the hose inside it, and when the cover is cooled and has become completely "set" the hose-ring (which is freely bendable) is withdrawn from the cover, leaving the latter ready for use or storage.

In using my invention with covers which have become cold the hose is inserted, as before described, and the whole subjected to a sufficient degree of heat, after which they are allowed to cool and set and the hose withdrawn.

I do not confine myself arbitrarily to the employment of a ring made from the hose material mentioned, as such ring may with advantage be constructed of other such like suitable flexible material having strength or flexibility analogous to the hose-ring.

Figure 2:
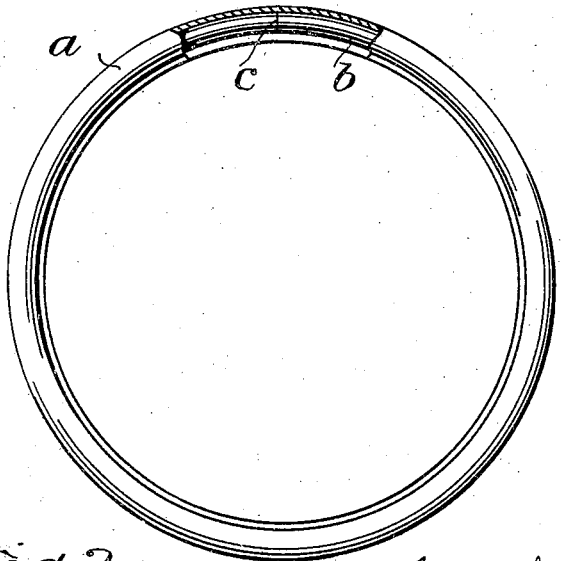

Referring now to the accompanying sheet of drawings, Figure 1 represents the edge of a tire-cover $a$ as it comes from the vulcanizing-machine, where it has been subjected to heat and pressure, the tire-cover at this stage being flat and finished, except that it is to be shaped or curled into the round form to hold the pneumatic tube and fit upon the wheel. Fig. 2 shows the tire-cover $a$ in the rounded form and with the flexible hosing $b$ in position, a portion of the cover being cut away to expose the said hose and show the meeting ends of the same at $c$.

Having now particularly described and ascertained the nature of my said invention and in what manner the same is to be performed, I declare that what I claim is—

1. The method of shaping outer band-like covers of wheel-tires, which consists in inserting in such cover while in a flattened form, a length of flexible hose the meeting ends of which come together to form a ring and then forming the cover over said ring and causing it to set while thus held.

2. The method of shaping outer band-like covers of wheel-tires, which consists in inserting in such cover while heated and in a flattened form of a portion of flexible hose or like body, the ends of which meet to form a ring when in place and in forming said cover over said ring and leaving it thereon until set.

3. The method of shaping outer band-like covers of wheel-tires, which consists in inserting in such cover while in a flattened form of a portion of flexible hose, the meeting ends of which come together to form a ring, forming the cover over said ring and then subjecting said covers to heat and allowing them to cool before removal from said ring.

In testimony whereof I have signed my name to this specification in the presence of two subscribing witnesses.

FREDERICK SAUL ORNSTIEN.

Witnesses:
   A. O. SACHSE,
   A. HARKER.